Sept. 16, 1952  H. H. DASEY  2,610,413
MODEL LAYOUT REPRO-TEMPLET METHOD
Filed Sept. 7, 1951  3 Sheets-Sheet 1

INVENTOR.
HOMER H. DASEY
BY
*his attorney*

INVENTOR.
HOMER H. DASEY

Sept. 16, 1952          H. H. DASEY          2,610,413

MODEL LAYOUT REPRO-TEMPLET METHOD

Filed Sept. 7, 1951          3 Sheets-Sheet 3

INVENTOR.
HOMER H. DASEY

Patented Sept. 16, 1952

2,610,413

UNITED STATES PATENT OFFICE 2,610,413

MODEL LAYOUT REPRO-TEMPLET METHOD

Homer H. Dasey, New Kensington, Pa., assignor to Visual Planning Equipment Co., Inc., Oakmont, Pa., a corporation of Delaware Application September 7, 1951, Serial No. 245,564

2 Claims. (Cl. 35—16)

1

The present invention relates generally to the making of factory layout plans and, more particularly, to the method of producing a model layout plan or negative print of a shop, office or the like, from which a large number of prints may be easily and quickly produced.

It is generally desirable to produce a number of prints of a shop layout plan, for example, for distribution to various departments, executive personnel, time study experts and other interested persons.

A common method of reproducing shop layout plans is to first draw on tracing paper or the like, the outlines of various pieces of equipment to scale as well as the structural parts of the building included in the plan, thereafter using such paper for the reproduction of the desired number of prints of the layout plan for general distribution to interested personnel. However, the drafting of the exact outline of each piece of equipment and the various constructional features of the building, such as elevators, ramps, etc., as well as the lettering of identifying nomenclature, involves considerable time and expense.

An object of the present invention is to provide a novel method of producing layout plans which is devoid of the above named disadvantages and which enables the reproduction of prints in a small fraction of the time required by employing present methods and which involves only a small fraction of the expense normally required.

A more specific object of the present invention is to provide a novel method of making two-dimensional prints of a three dimensional miniature shop layout plan that will avoid the necessity of drawing outlines to scale of various pieces of equipment, machinery, building structural elements, etc., included in the shop layout plan.

Other objects and advantages of the present invention will become apparent from a study of the following description, taken with the accompanying drawings wherein:

Figure 4 shows the next step of removal of

Figure 5:
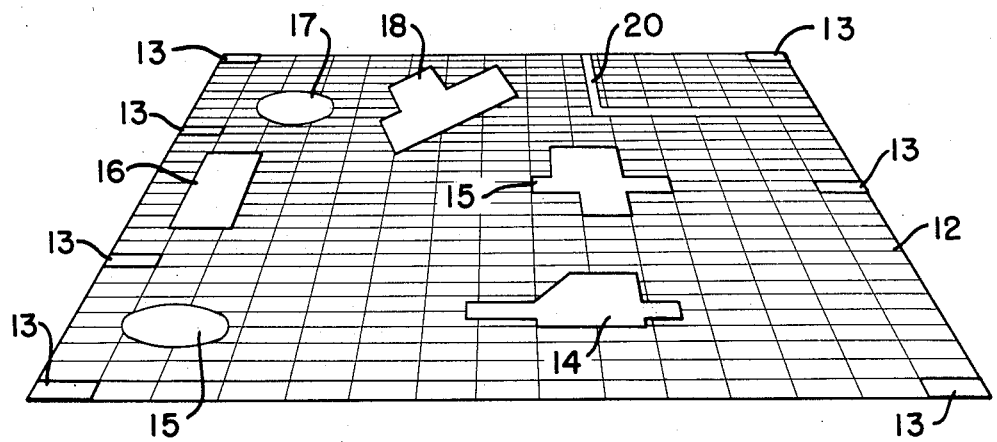

2 the film grid sheet together with the attached cutout pieces corresponding exactly in outline and disposition with the bases of the various miniature model pieces mounted on base 2, and Figure 5 is a perspective view showing a film reproduction of a typical model layout from which prints may be obtained on any type of commercial printer, such as blueprint, Ozalid, photostat, etc.

A highly useful method for planning layouts in shops, offices, etc., is to employ miniature three-dimensional models which are shaped and built to scale to correspond exactly to various pieces of equipment, such as shop machinery, etc., and to place these miniature models on a base, corresponding to the shop floor, in the desired positions for providing maximum production efficiency, for most effectively utilizing a given shop space, and for various other reasons. Such miniature models lend themselves to easy shifting around until the desired or optimum arrangement is attained. This method of planning has become known in the trade as "visual" planning, since a visual picture of the final layout is quickly obtained not only by engineers and other technical personnel, but by managers, executives, and others that may be less technically inclined and that may find more difficulty in reading blueprints, but are nevertheless interested in the layout of the shop, offices, etc.

The present invention is directed to the method of making a number of prints of shop layout plans and the like from the above described three-dimensional model layout after optimum arrangement of the miniature three-dimensional pieces has been obtained.

Figure 1:
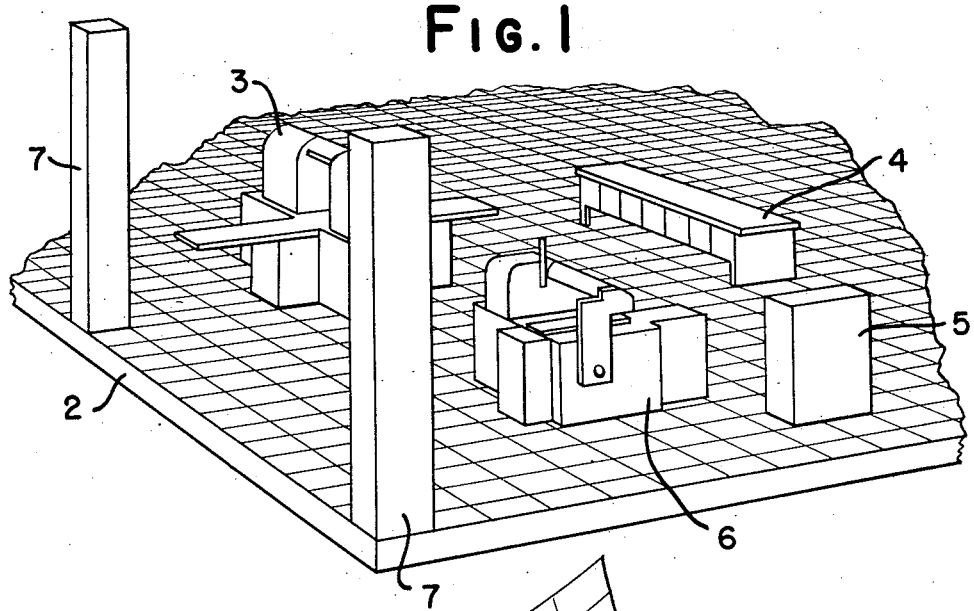
Figure 1 is a fragmentary perspective view of a model layout including miniature models built to scale mounted on a grid base.
Figure 2:
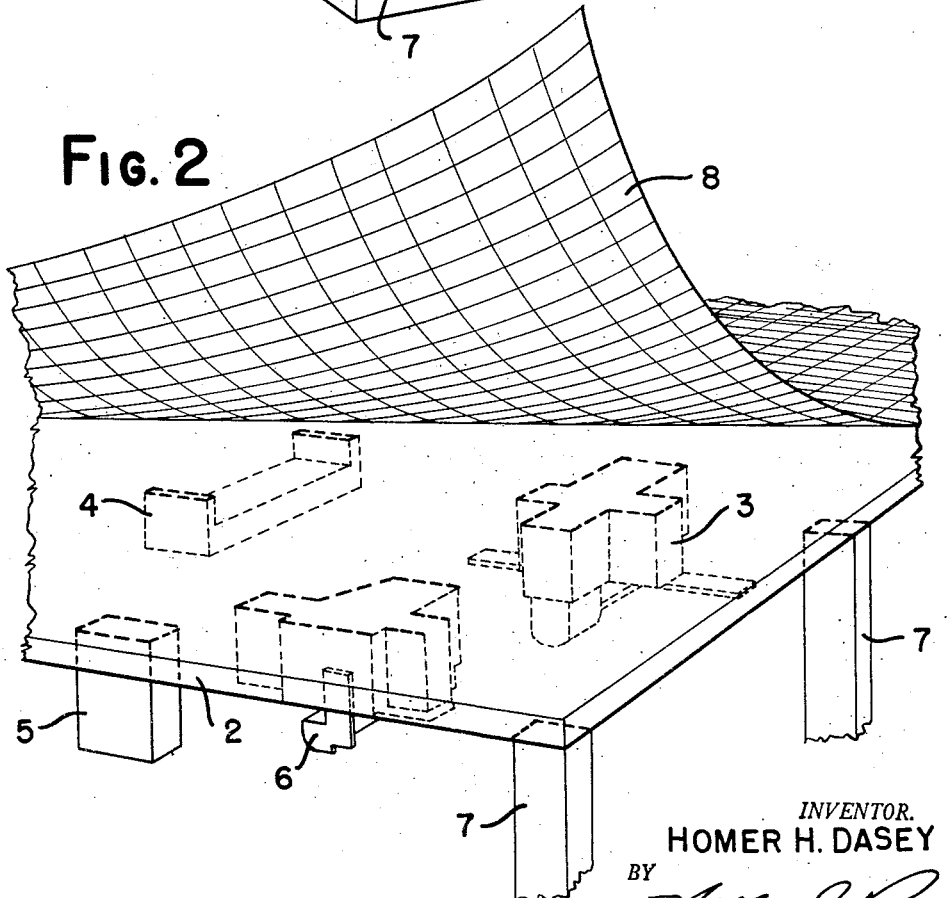
Figure 2 shows the step involved in the present method of attaching a sheet of film with grid markings on the bottom surface of the base of the layout shown in Figure 1 after inverting the latter.
Figure 3:
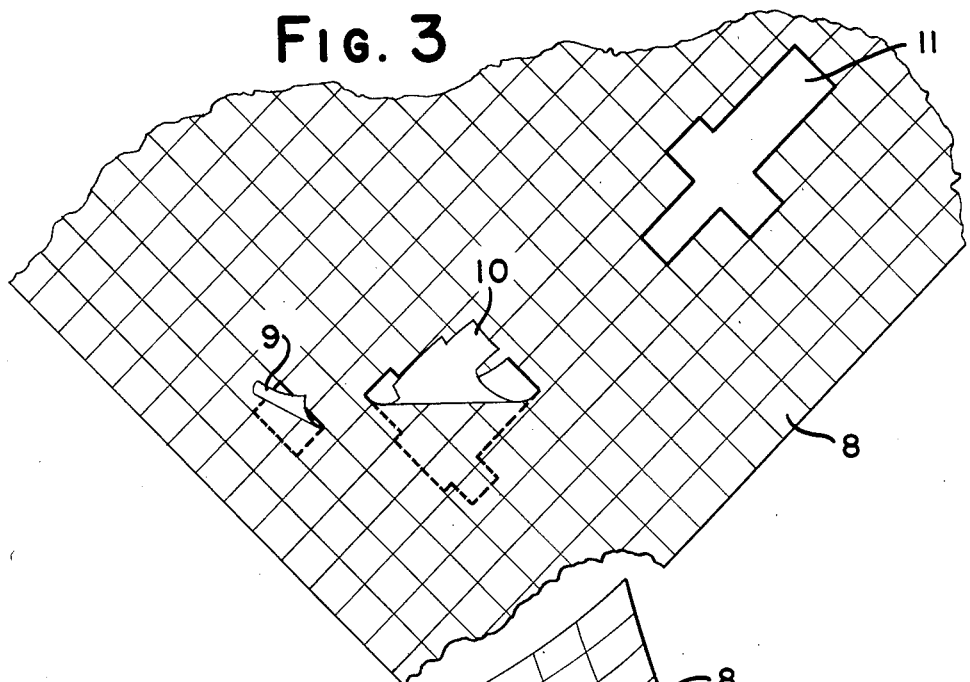
Figure 3 shows the following step of attaching film cutouts or reproduction templets on the outer surface of the film grid sheet in matching relationship with the exposed bottom areas of correspondingly shaped miniature models.

In carrying out the present method, and referring more particularly to Figure 1, a base 2 of transparent material, such as glass, but preferably transparent plastic material, such as Lucite, is employed in any suitable size, such as a standard 2' by 3' sheet of sufficient thickness as to make it rigid. Upon base 2 are mounted a plurality of miniature models, such as 3, 4, 5 and 6, which are miniature replicas of wood or other suitable material of pieces of equipment, such as shop machinery, etc., to be included in the shop layout plan. These miniatures are exact three-dimensional models, built to scale, of the simulated machinery or equipment. And in the case of machinery with horizontally moving parts, such as planing machines, etc., the models involve outlines showing the maximum extent of horizontal movement of reciprocating parts so that this factor may be taken into account in determining the required space necessary for operating the particular machine. The various miniature models or templets, such as 3 to 6, inclusive, are firmly attached to base 2, after their preferred positions have been determined, by means of pressure sensitive cement or other suitable adhesive material. Also secured to base 2 are columns 7 disposed about the periphery of base 2 to serve as legs for supporting the assembly when inverted as shown in Figure 2. Preferably grid lines are printed on base 2 to give a better indication of floor space area, distance between adjoining pieces of equipment, etc., to aid in the proper positioning of the various pieces of equipment and machinery.

After all of the miniature pieces have been attached to the top surface of base 2, as shown in Figure 1, the entire assembly is inverted, as shown in Figure 2, and supported on the leg-forming columns 7, thereby exposing the base outlines of the various miniature models. A sheet of transparent film 8 having grids marked thereon corresponding to the grids on base 2, is then placed on the top surface of base 2, as viewed in Figure 2, and is held in place thereon by pressure sensitive cement or other suitable fastening means.

Small cutouts or reproduction templets, such as 9 and 10, which are shaped so as to exactly correspond to the outlines of various pieces of machinery or equipment, such as 3 to 6, inclusive, are then attached to the outer surface of film grid 8 so as to exactly match and cover the exposed base surface of the various corresponding miniature pieces. Each of these cutouts or reproduction templets has printed on it the name, model number and other identification of the represented piece of equipment. For example, an appropriately shaped piece may be identified as Cincinnati Milling Machine No. 1-18 Horizontal, P168, thus identifying the name, type and model number of the machine. The cutout portions or reproduction templets, such as 9 and 10, are preferably in the form of black pieces of film with white lettering and numbers for identifying the represented piece of equipment.

Figure 4:
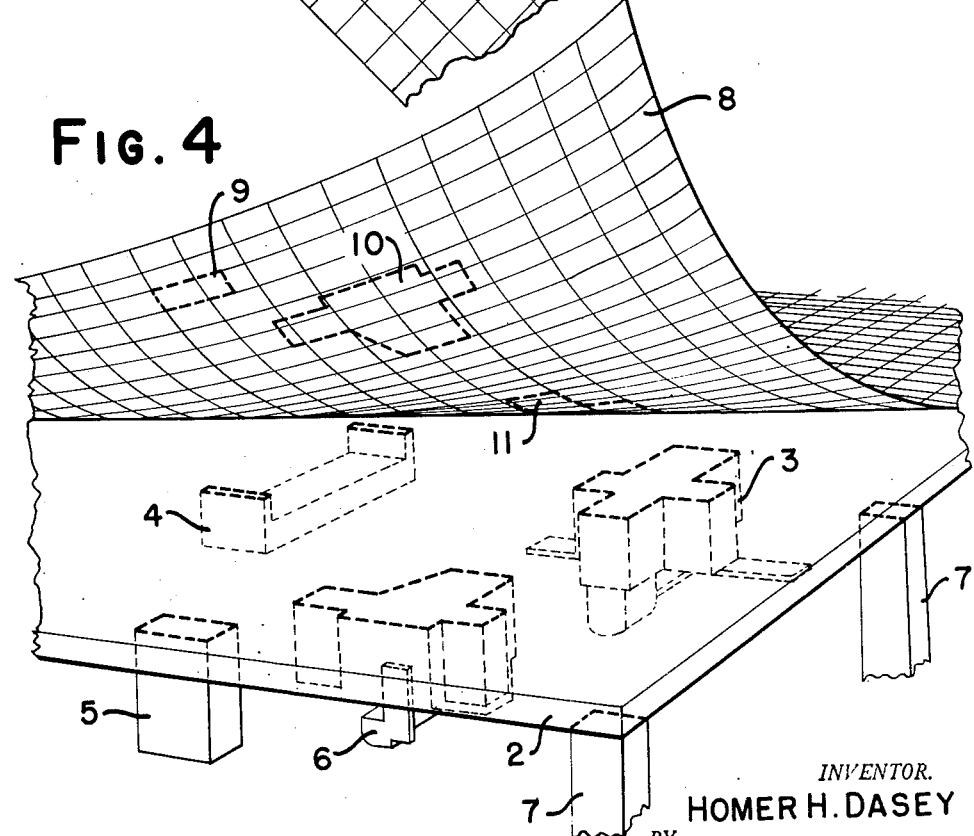

After all of the exposed bases of the miniature models have been covered by exactly matching, film cutouts attached to the film grid 8, preferably by pressure sensitive adhesive, and with the emulsion side up so that lettering will be read properly when printed, the film grid sheet 8 is detached from base 2 and removed, as shown in Figure 4, and is now ready for placement in any type of commercial machine, such as blueprint, Ozalid, photostat, etc., for the purpose of making reproductions or prints therefrom.

Figure 5 shows a typical sheet of film with grid markings and having different miniature models than those illustrated in Figures 1 to 4, inclusive, illustrating the appearance of the film grid sheet after attachment thereto of the various film cutouts or reproduction templets, representing to scale in two dimensions the various pieces of equipment included in the layout plan. Numeral 12 denotes the thin flexible sheet or film with grid markings and having outlines 13 representing columns and having attached thereto various film cutouts or reproduction templets 14, 15, 16, 17 and 18, illustrative of various pieces of equipment or shop machinery as well as film cutout piece 20 representing the outline of a wall or partition. The assembly is in effect a film negative useful for reproduction printing.

It will be apparent, of course, that any desired piece of equipment, such as a shop machine, a desk, etc., and any desired constructional feature of a shop, such as a ramp, stairway, elevator, partition, etc., as well as machine operators may be represented by cutout portions made to scale and shaped to the outline of the floor space covered or overhung. It will be further apparent that by my novel method there is entirely eliminated the necessity of making drawings, such as tracings, for the reproduction of prints. By employing my method, one merely stocks a variety of cutout portions representing standard pieces of equipment and machinery, but this involves considerably less work, particularly on the part of the user, than that required for drawing on paper a preferred shop layout plan.

Thus it will be seen that I have provided an efficient, time saving method for reproducing floor layout plans, which method requires perhaps only 1/20 of the time formerly required for drafting and reproduction of such layout plans by well known procedures, and requires considerably less expense without sacrificing accuracy or detail in identification of parts.

While I have illustrated and described a certain, specific embodiment of my invention, it will be understood that this is by way of illustration only, and that various changes and modifications may be made within the contemplation of my invention and within the scope of the following claims.

I claim:

1. The method of producing prints of a floor layout plan which comprises placement of miniature models of equipment on the top surface of a base of transparent material, attaching a sheet of transparent film on the bottom surface of said base and thereafter attaching to the exposed surface of said sheet, in registry with the outlines of said models, cutout sheet portions which exactly match in outline the exposed base portions of said models and which bear identifying indicia of the equipment represented, and finally removing said sheet and attached cutout sheet portions and using it as a pattern for photographic reproduction.

2. The method of making a film negative for printing a plurality of duplicate floor layout plans, which comprises mounting a plurality of three-dimensional miniature models on a rigid base of transparent material having pillar-like supports along the perimeter of said base extending in the same direction as said models, inverting said base and supporting it by said supports so that the models will extend downwardly, attaching a sheet of film having a grid marked thereon onto the surface of the base opposite to that on which said miniature models are mounted, adhering film cutout portions, having configurations corresponding exactly to the outlines of said miniature models, onto said sheet of film in exact registry with the exposed bases of said miniature models, and finally removing said sheet together with the attached film cutout portions and using it as a pattern for the photographic reproduction of a plurality of duplicate prints therefrom.

HOMER H. DASEY.

REFERENCES CITED

The following references are of record in the file of this patent:

UNITED STATES PATENTS

| Number | Name | Date |
|---|---|---|
| 2,484,412 | Keel | Oct. 11, 1949 |
| 2,545,409 | McCall | Mar. 13, 1951 |